(12) United States Patent
Sawa

(10) Patent No.: US 7,918,662 B2
(45) Date of Patent: Apr. 5, 2011

(54) INTEGRATED APPARATUS HAVING KNEADING PART AND INJECTING PART

(76) Inventor: Kohei Sawa, Osaka (JP)

( * ) Notice: Subject to any disclaimer, the term of this patent is extended or adjusted under 35 U.S.C. 154(b) by 0 days.

(21) Appl. No.: 12/375,465

(22) PCT Filed: Jul. 30, 2007

(86) PCT No.: PCT/JP2007/064892
§ 371 (c)(1),
(2), (4) Date: Jan. 28, 2009

(87) PCT Pub. No.: WO2008/016005
PCT Pub. Date: Feb. 7, 2008

(65) Prior Publication Data
US 2009/0311358 A1    Dec. 17, 2009

(30) Foreign Application Priority Data

Aug. 2, 2006  (JP) .................................. 2006-211188

(51) Int. Cl.
*B29C 45/48* (2006.01)
(52) U.S. Cl. .................. 425/205; 425/208; 425/587
(58) Field of Classification Search .................. 425/148, 425/529, 205, 208, 587
See application file for complete search history.

(56) References Cited

U.S. PATENT DOCUMENTS

| | | | |
|---|---|---|---|
| 3,481,001 A | | 12/1969 | Stillhard |
| 3,825,235 A | * | 7/1974 | Schwertfeger et al. ........ 425/146 |
| 4,557,683 A | * | 12/1985 | Meeker et al. ................ 425/147 |
| 4,591,467 A | * | 5/1986 | Kopernicky ............... 264/37.17 |
| 5,534,204 A | * | 7/1996 | Aoki et al. ..................... 264/102 |
| 5,672,005 A | | 9/1997 | Fukui et al. |
| 5,925,295 A | | 7/1999 | Nakamura et al. |
| 6,071,462 A | * | 6/2000 | Putsch ..................... 264/328.14 |
| 6,468,464 B1 | * | 10/2002 | Eckardt et al. .......... 264/328.18 |

FOREIGN PATENT DOCUMENTS

| | | |
|---|---|---|
| JP | 60-9710 | 1/1985 |
| JP | 62-147516 | 9/1987 |
| JP | 5-38738 | 2/1993 |

(Continued)

OTHER PUBLICATIONS

International Search Report issued Sep. 4, 2007 in the International (PCT) Application of which the present application is the U.S. National Stage.
Patent Cooperation Treaty (PCT) International Preliminary Report on Patentability, issued Feb. 10, 2009 in International Application No. PCT/JP2007/064892.
Partial English translation of JP 62-147516, which was cited in the IDS filed Jan. 28, 2009.

*Primary Examiner* — Jill L Heitbrink
(74) *Attorney, Agent, or Firm* — Wenderoth, Lind & Ponack, L.L.P.

(57) ABSTRACT

An apparatus having a kneading part for performing kneading of a material and an injecting part for performing injection of the material in an injection molding operation with the kneaded material. The kneading part and the injecting part are connected together. The injecting part includes a weighing screw channel portion for weighing the material and a retention screw channel portion that is formed adjacently to the weighing screw channel portion. The injecting part has an injection screw shaft defining differently shaped channels that form a material retention space for retaining the material fed continuously quantitatively from the kneading part. Thereby, the material fed continuously quantitatively from the kneading part can be securely retained in the injecting part where intermittent operation is performed.

5 Claims, 9 Drawing Sheets

FOREIGN PATENT DOCUMENTS

| | | |
|---|---|---|
| JP | 6-328435 | 11/1994 |
| JP | 7-251433 | 10/1995 |
| JP | 7-106586 | 11/1995 |
| JP | 2000-254949 | 9/2000 |
| TW | 461852 | 11/2001 |
| TW | 200526396 | 8/2005 |

* cited by examiner

INTEGRATED APPARATUS HAVING KNEADING PART AND INJECTING PART

BACKGROUND OF THE INVENTION

1. Technical Field

The present invention relates to an integrated apparatus having a kneading part and an injecting part, which includes the kneading part for performing kneading of a material and the injecting part for performing material injection for injection molding with the kneaded material and in which the kneading part and the injecting part are connected together, i.e., to a kneading and injecting apparatus.

2. Description of the Related Art

Conventionally, when manufacturing a molded article as a final product by an injection molding apparatus, there has been performed a kneading (i.e., compounding) process of a loaded material while heating the material by means of, for example, a kneading apparatus that has a screw shaft of, for example, a single-axis or twin-axis configuration. The material is extruded from the kneading apparatus and thereafter the kneaded material is pelletized. In such a pelletizing process, the process of producing pellets of a prescribed size is performed by, for example, solidifying the material in a plasticized state by cooling and thereafter cutting the material into a prescribed size. Subsequently, the thus-produced pellets are loaded into the injection molding apparatus, and the material is plasticized with a pressure applied thereto while being reheated. By weighing a prescribed amount of the material and extruding the weighed material by the screw shaft in this state, loading, i.e., injection of the material into the communicating injection mold is performed.

However, when the kneading apparatus and the injection molding apparatus are individually used as described above, the material, which has been heated and plasticized by the kneading apparatus, is to be reheated and plasticized in the injection molding apparatus. Therefore, not only the number of processes to the injection molding is increased but also the frequency of the thermal history of the material is increased, resulting in a reduction of the physical properties of the material and sometimes causing an adverse effect on the quality of the molded article to be manufactured.

In order to address the above-described conventional problems, an integrated apparatus in which the kneading apparatus and the injection molding apparatus are mutually connected and which is able to feed the material kneaded in the kneading apparatus as it is to the injection molding apparatus and to perform injection of the mold material into an injection molding mold has been considered (refer to, for example, JP H07-106586 B2).

SUMMARY OF THE INVENTION

As described above, the apparatus in which the kneading apparatus and the injection molding apparatus are integrated with each other has the advantage that manufacturing efficiency can be improved in comparison with the conventional apparatus in which they are not integrated with each other in terms of the point that the injection molding can be performed by sending the material kneaded and plasticized in the kneading apparatus into the injection molding apparatus without pelletizing the material and injecting the mold material weighed by the injection molding apparatus. However, an issue exists as to how the material, which has been plasticized in the kneading apparatus, is sent into the injection molding apparatus. Taking one example, the kneading process in the kneading apparatus is sometimes influenced by the pressure of the injection molding apparatus, and the injection molding process in the injection molding apparatus is sometimes influenced by the material fed by the kneading apparatus in the integrated apparatus as in JP H07-106586 B2. That is, an issue exists as to how the influence from one apparatus to the other apparatus is eliminated.

Specifically, in the injection molding apparatus, "intermittent operation" such that the rotation and stop of the rotation of the screw shaft are repeated is to be performed, as by loading the material into a space ahead of the shaft while weighing the material by retreating the rotating screw shaft and thereafter injecting the loaded material into the injection molding mold by slidingly moving forward the screw shaft of which the rotation is stopped. In contrast to this, in the kneading apparatus, "continuous operation" such that the material is kneaded and plasticized by the rotation of the screw shaft while the plasticized material is fed to the outside of the apparatus by the rotation of the screw shaft is to be performed. Therefore, an issue arises as to how the material, which is continuously fed by the kneading apparatus, is processed in the injection molding apparatus in which intermittent operation is performed. If a construction is adopted in which the operation of the kneading apparatus, i.e., the feed rate of the material is made variable in accordance with the amount of the material to be processed in the injection molding apparatus, then the kneading state, the thermal history state and so on of the material become non-uniform, possibly exerting adverse influences on the quality of the product.

In particular, the integrated apparatus as disclosed in JP H07-106586 B2 adopts the construction in which the material from the kneading apparatus is sent into a portion of the so-called weighing portion (which is a portion having a function of weighing the material by using a screw channel and therefore the portion generally has a shallow channel depth and a small space capacity due to the problems of the occurrence of slip and the like, leading to a limit in the channel depth) at the screw shaft of the injection molding apparatus. Therefore, it becomes difficult to continuously perform the material feed from the kneading apparatus to the injection molding apparatus.

Moreover, in the injection molding operation, it is an important factor to sufficiently remove volatile components and air bubbles from the material and increase the material density in forming a product of high quality. However, the apparatus of JP H07-106586 B2 has a problem in that a deaerating port is provided in the neighborhood of the root of the screw shaft of the injection molding apparatus, and the deaeration of the material becomes insufficient, sometimes failing to improve the product quality. In particular, the rotational speed of the screw shaft changes in the injection molding apparatus, and therefore, a sufficient deaerating effect cannot be expected by only the injection molding apparatus. Moreover, in the kneading apparatus, the material flows consistently in a fully loaded state in the neighborhoods of the connection to the injection molding apparatus, and therefore, it is difficult to expect a deaerating effect to be provided by means of a vent or the like in such a portion.

An object of the present invention is to solve the above problems and provide an integrated apparatus having a kneading part and an injecting part. The kneading part functions to perform kneading of a material and the injecting part functions to perform material injection for injection molding with the kneaded material. The kneading part and the injecting part are connected together. The apparatus is capable of manufacturing an injection molded article of high quality without deteriorating the physical properties of the injected material while suppressing the influence that one of the kneading part and the injecting part exerts on the other.

In order to achieve the above object, the present invention is constructed as follows.

According to a first aspect of the present invention, there is provided an integrated apparatus having a kneading part and an injecting part. The kneading part comprises:
a kneading screw shaft;
a kneading shaft drive unit for driving rotation of the kneading screw shaft; and
a kneading barrel, in which the kneading screw shaft is rotatably inserted and placed, and kneading of a material is performed by rotating the kneading screw shaft, and which continuously quantitatively feeds the kneaded material from a kneaded material feed throat at a tip end thereof.

The injecting part comprises:
an injection screw shaft;
an injection shaft drive unit for driving rotation and advancing and retreating movements along an axial direction of the injection screw shaft; and
an injection cylinder, in which the injection screw shaft is inserted and placed rotatably with a capability of advancing and retreating along an axial direction thereof, and a communication port and an injection port are formed, the communication port being formed so as to communicate with the kneaded material feed throat of the kneading barrel and receive the fed material in the kneaded state, and the injection port being formed so as to inject the material weighed by the screw shaft therefrom.

The injection screw shaft, located in the injecting part, comprises:
a weighing screw channel portion for weighing the material by rotational driving amount of the injection screw shaft and loading the material into a material loading space formed on a forward side by retreating movement of the injection screw shaft; and
a retention screw channel portion which is formed adjacently to the weighing screw channel portion so that a channel shape thereof is different and forms a material retention space for retaining the material fed continuously quantitatively from the kneading part.

According to a second aspect of the present invention, the injection screw shaft is moved so as to advance and retreat between a retreat position where the material loading space is formed and an advance position where the material is injected from an injection port. The material is weighed and loaded in the material loading space.

The retention screw channel portion is formed on the injection screw shaft so that the material retention space is located at the communication port regardless of the advancing and retreating movements of the injection screw shaft between the advance position and the retreat position.

According to a third aspect of the present invention, the retention screw channel portion is formed on the injection screw shaft so that the material fed continuously quantitatively from the kneading part through the communication port is retained in the material retention space during the advancing movement from the retreat position toward the advance position in a state in which the rotation is stopped.

According to a fourth aspect of the present invention, the kneading part comprises two screw shafts which are formed in a wave-like shape having an identical diameter and an identical root diameter and are mutually engaged and arranged in parallel as the kneading screw shaft. The kneading shaft drive unit rotates the shafts at an identical speed in an identical direction, and the screw shafts are rotatably inserted in the kneading barrel. A kneading process for the material is performed by rotational driving of the screw shafts, and a deaerating process for the material is performed.

According to the present invention, in the integrated apparatus in which the kneading part for performing continuous quantitative material feed and the injecting part for performing an intermittent injecting process are integrated with each other, the screw channel portion for performing weighing of the material and the retention screw channel portion are formed on the injection screw shaft. It becomes possible to securely retain the material fed continuously quantitatively from the kneading part in the injecting part where intermittent operation is performed. Moreover, by virtue of the material retention space provided in the injecting part, the injection molding pressure generated at the weighing screw channel portion can be prevented from influencing the kneading part. With this arrangement, the state of physical properties, the state of thermal history and so on of the kneaded material fed from the kneading part can be kept uniform.

Moreover, the injecting part is able to perform weighing of the material while retaining the material fed continuously from the kneading part in the material retention space without performing further processing for plasticization and to inject the weighed material. Therefore, it is not necessary to provide the injection screw shaft with the screw channel portion for the plasticization of the material to allow the apparatus construction to be simplified and the retention time of the material in the injecting part to be shortened by increasing the material conveyance speed. Therefore, the state of physical properties, the state of thermal history and so on of the material can be maintained satisfactory, and the quality of the product formed by the injection molding operation can be improved.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE INVENTION

Figure 1:
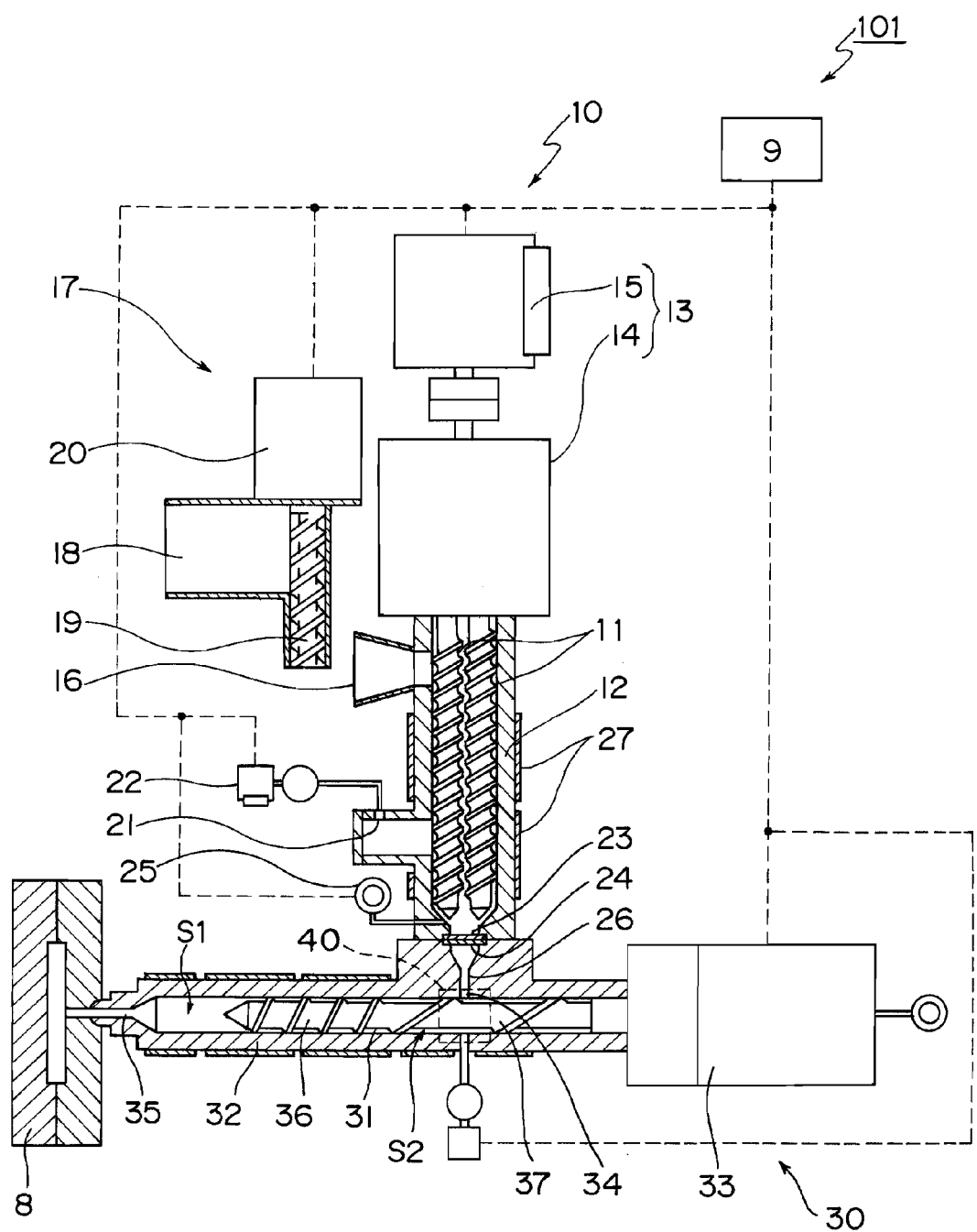
FIG. 1 is a schematic structural view of an apparatus integrated with a kneading part and an injecting part according to a first embodiment of the present invention.

Before the description of the present invention proceeds, it is to be noted that like parts are designated by like reference numerals throughout the accompanying drawings.

Hereinbelow, an embodiment of the present invention will be described in detail with reference to the accompanying drawings.

The First Embodiment

A schematic structural view showing the construction of an apparatus 101 integrated with a kneading part and an injecting part as one example of the integrated apparatus that has the kneading part and the injecting part according to the first embodiment of the present invention is shown in FIG. 1. It is noted that the internal construction of the apparatus 101 integrated with the kneading part and the injecting part is shown by using a schematic cross section in FIG. 1. It is noted that the apparatus 101 integrated with the kneading part and the injecting part of the present first embodiment can also be referred to as a kneading and injecting apparatus.

As shown in FIG. 1, the apparatus 101 has a kneading part 10 that kneads and plasticizes a material by performing compression and shearing of the loaded material, and an injecting part 30 that is connected with the kneading part 10 so that the material that has been plasticized in the kneading part 10 is weighed, injected and loaded directly into an injection molding mold.

The construction of the kneading part 10 will be described first. As shown in FIG. 1, the kneading part 10 has a kneading screw shaft 11, a kneading barrel 12 and a kneading drive unit 13. The barrel 12 is formed in a roughly cylindrical shape so as to provide a space in which the screw shaft 11 is placed. In the first embodiment, two shafts 11 that have identical size and shape are mutually engaged and placed in the barrel 12. A screw channel of, for example, an identical wave-like shape is formed on each of the screw shafts 11, and both of them are placed so that a minute gap is provided between them so that the threads and grooves of the screw channels do not come into contact with each other. Moreover, the shapes of both of them are determined so that a minute gap is secured between the outer peripheral end portions of each of the screw shafts 11 and the inner peripheral surface of the barrel 12.

The kneading drive unit 13 is the unit that functions to rotationally drive the two screw shafts 11, for example, in the same direction at the same speed in the barrel 12. Specifically, the kneading drive unit 13 has a gearbox 14 that transmits a rotary driving torque in the same direction at the same speed to each of the screw shafts 11, and a kneading drive motor 15 that transmits a rotary driving force to the gearbox 14.

Moreover, as shown in FIG. 1, the kneading part 10 has a material feeding unit 17 that feeds a prescribed amount of pellets or a powdery material to a material inlet 16 provided at the barrel 12. The material feeding unit 17 has a hopper 18 into which the pellets or powdery material are put, a screw (or coil) 19 that continuously feeds the material put in the hopper 18 by a prescribed amount, and a material feeding drive motor 20 that rotationally drives the screw 19.

Moreover, the barrel 12 has a vent portion 21 that is the air vent for removing gas generated by air bubbles and volatile components mixed in the material conveyed by the two screw shafts 11. It is noted that a vacuum pump 22 is connected to the vent portion 21 through connecting piping in order to achieve efficient ventilation. Further, at an end portion on the forward side (i.e., end portion on the side where the material is extruded) of the barrel 12 of the kneading part 10 are provided a filter 23 that removes foreign objects existing in the material by making the material, which has been sufficiently kneaded and plasticized, pass therethrough by its extrusion pressure, a breaker plate 24 to which the filter 23 is attached and which rectifies the flow of the material made to pass therethrough by the extrusion pressure, and a pressure sensor 25 that detects an internal pressure in the neighborhood of the forward end portion in the barrel 12. At the forward end portion of the barrel 12 is provided a kneaded material feed throat 26 that feeds the material, which has been kneaded and sufficiently plasticized, directly to the injecting part 30. Moreover, around the outer periphery of the barrel 12 is placed an electric heater 27 that assists the plasticization of the material by heating the material to be kneaded to a desired temperature. Moreover, for example, one having a wire net or mesh shape can be used as the filter 23, and a tip end back pressure increases at the tip end of the barrel 12 as the net (mesh) becomes finer. It is noted that a straight ring can be used in place of the breaker plate 24 depending on the material to be handled.

The construction of the injecting part 30 is described next. As shown in FIG. 1, the injecting part 30 has an injection screw shaft 31, an injection cylinder 32, and an injection drive unit 33 that drives the operation of the injection screw shaft 31. The cylinder 32 is formed into a roughly cylindrical shape so as to provide a space in which the screw shaft 31 can be placed. Moreover, the screw shaft 31 is inserted and placed so as to be rotatable and able to advance and retreat along the axial direction thereof, i.e., slidingly movably in the cylinder 32 and constructed so that the rotational movement and the slide movement are driven by the injection drive unit 33. A communication port 34 is formed at the e injection cylinder 32. The communication port 34 communicates with the kneaded material feed throat 26 at the barrel 12 of the kneading part 10. An injection port 35 injects the material that has been weighed by the prescribed amount and loaded by the screw shaft 31 toward the outside of the cylinder 32. As shown in FIG. 1, by releasably connecting an injection molding mold 8 to the injection port 35, the material in the plasticized state through the injection port 35 of the injecting part 30, i.e., the injection molding material can be fed into the mold 8. Moreover, between the inner peripheral surface of the cylinder 32 and the outer peripheral end portion of the screw shaft 31 is provided a minute gap so that these portions do not contact each other.

Moreover, as shown in FIG. 1, two kinds of screw channel portions are formed on the outer peripheral surface of the screw shaft 31 of the injecting part 30. One is a weighing screw channel portion (or this may be simply referred to as a weighing screw) 36 that weighs and loads a prescribed amount of material by the amount of rotational drive of the shaft 31 into a material loading space S1 formed on the forward side (on the leftward side in FIG. 1) inside the cylinder 32 by the retreating movement (rightward movement in FIG. 1) of the shaft 31 by the injection drive unit 33. The other is a retention screw channel portion (or this may be simply referred to as a retention screw) 37 that is adjacently formed to communicate with the weighing screw channel portion 36 with a channel shape that is different from that of the weighing screw channel portion 36. The retention screw channel portion forms a material retention space S2 for retaining the material fed continuously quantitatively through the communication port 34 from the kneaded material feed throat 26 of the kneading part 10.

As is apparent from FIG. 1, the retention screw channel portion 37 is formed so that the lead angle of the screw is greater than that of the weighing screw channel portion 36 and the depth of the channel portion is deeper than the weighing screw channel portion 36. By thus forming the channel portions 36 and 37, a comparatively small space can be formed as a space surrounded by the inner peripheral surface of the cylinder 32 and the inner peripheral surface of the channel portion of the screw shaft 31 in the weighing screw channel portion 36. Thus, it becomes possible to accurately weigh the material in the plasticized state by utilizing such a space. On the other hand, a comparatively large space can be formed in the retention screw channel portion 37, and it becomes possible to make the material retention space S2 able to retain the material fed continuously quantitatively through the communication port 34. It is noted that the "material retention space S2" serves as the space for receiving and retaining the material fed continuously quantitatively from the kneading part 10 and also the space in which the retained material is temporarily on standby to be delivered to the space in the adjacent weighing screw channel portion 36, the space bearing the role of a sort of buffering between the kneading part 10 and the space inside the weighing screw channel portion 36.

Figure 2:
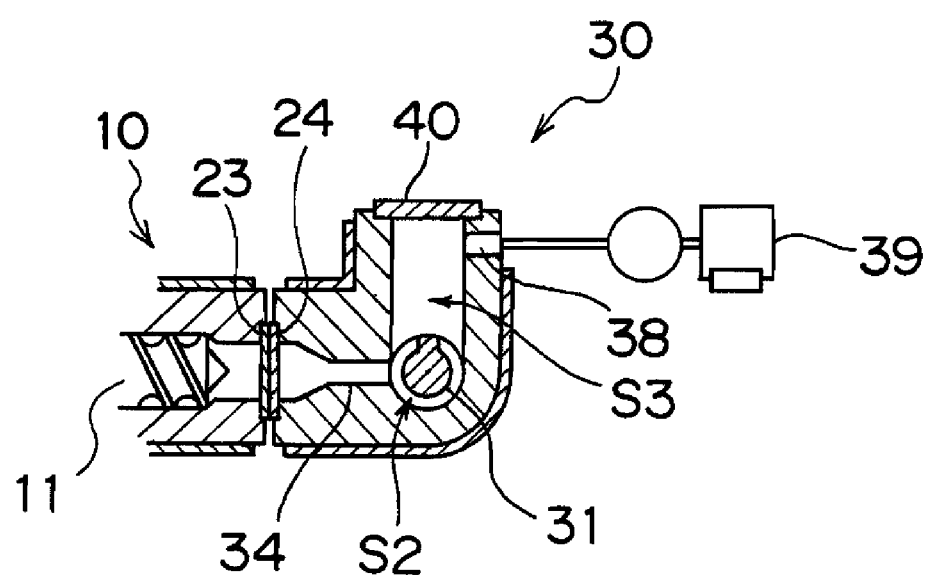
FIG. 2 is a schematic sectional view of a connection portion of the kneading part and the injecting part in the apparatus integrated with the kneading part and the injecting part of FIG. 1.

A schematic partial sectional view of the portion where the kneading part 10 and the injecting part 30 are connected together is shown in FIG. 2. As shown in FIGS. 1 and 2, a vent space S3 where the internal space of the cylinder 32 is partially expanded is provided above the screw shaft 31 in the portion where the communication port 34 is provided in the cylinder 32 of the injecting part 30. Also, a vent portion 38 communicates with the vent space S3 and a vacuum pump 39 is connected to the vent portion 38 via connecting piping. Further, a sight glass 40 is provided above the vent space S3 so that the material retention space S2 can be visually confirmed. Moreover, an electric heater 41 for heating or keeping the temperature of the material in the plasticized state is provided on the outer peripheral surface of the cylinder 32.

Figure 10:
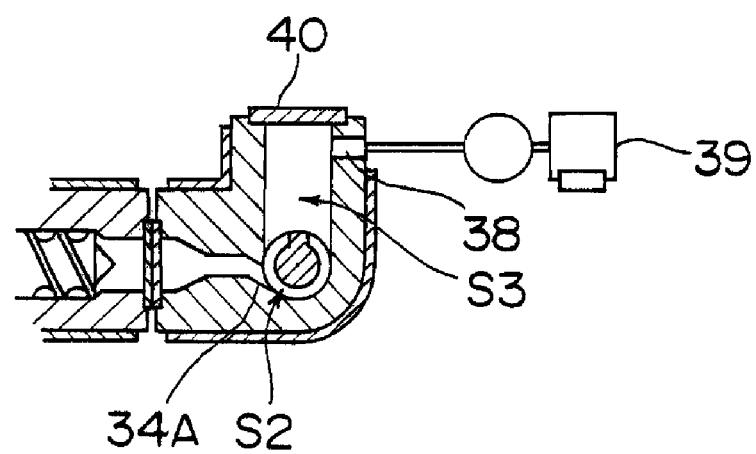
FIG. 10 is a schematic sectional view showing a modified example of the communication port in the apparatus integrated with the kneading part and the injecting part of the first embodiment.

Moreover, as shown in FIG. 2, the communication port 34 to which the plasticized material is fed from the kneading part 10 is formed so as to be connected to a side portion (i.e., connected to a left side portion in FIG. 2) of the internal space of the generally cylindrical cylinder 32. Also, the formation direction and the rotational direction (counterclockwise in the figure) of the screw channel of the screw shaft 31 are determined so that the material fed from the communication port 34 into the material retention space S2 turns round the lower side of the screw shaft 31 in FIG. 2. Regarding the connection form of the communication port 34 as described above, other various forms can be adopted, and it is also acceptable to form the communication port 34A so that it is inclined in a downward direction in order to make the material feed into the material retention space S2 smoother as shown in, for example, the schematic sectional view of FIG. 10.

The apparatus 101 has a controller 9 that performs comprehensive control while inter-relating the operations of the components. In particular, the controller 9 performs operation control of a material feed drive motor 20 to feed a prescribed amount of material to the kneading part 10, performs operation control of a kneading drive motor 10 to continuously quantitatively feed the kneaded material while performing the kneading process of the fed material and then performs operation control of the vacuum pump 22 to sufficiently deaerate the material in the barrel 12. Moreover, in the injecting part 30, driving control of the injection drive unit 33 is performed by the controller 9 to perform the rotational driving and slide movement of the screw shaft 31 in accordance with a prescribed timing.

Next, a sequence of operations and processing of the material put in the kneading part 10 until the material is injected and loaded into the injection molding mold 8 by the apparatus 101 are described below with reference to the schematic explanatory view of the apparatus 101 integrated with the kneading part and the injecting part shown in FIG. 3 through FIG. 6 and the flow chart of the operating procedures of the processes carried out in the injecting part 30 shown in FIG. 7. It is noted that the sequence of operations and processes as described above in the apparatus 101 are executed by controlling the components interrelated by the controller 9.

Figure 3:
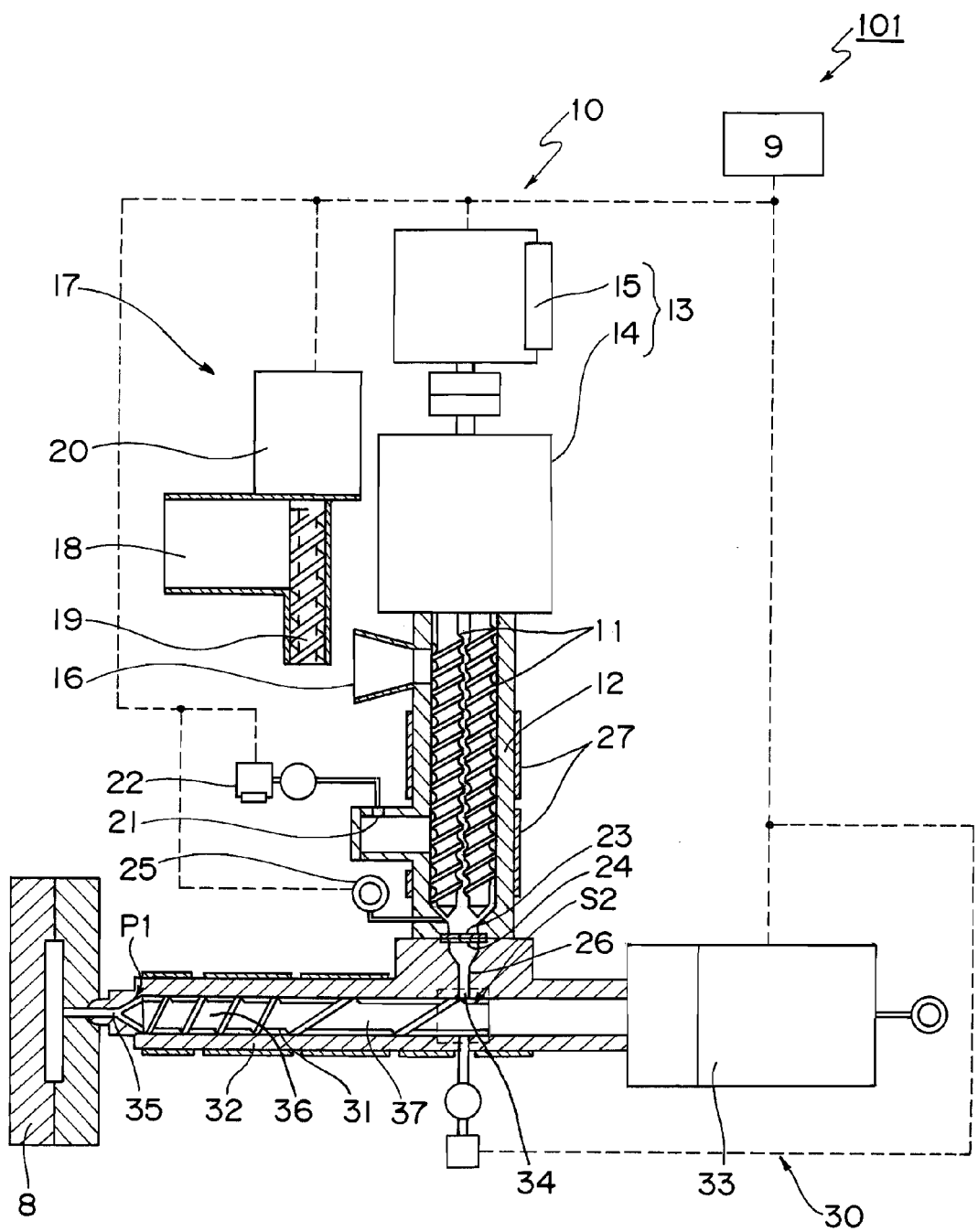
FIG. 3 is a schematic explanatory view showing a state in which an injection screw shaft is located in an advance position in the apparatus integrated with the kneading part and the injecting part of the first embodiment.

First of all, in the apparatus 101 shown in FIG. 3, a material to be kneaded, or a material in, for example, a pellet form or a powder form is put into the hopper 18 of the material feeding unit 17 of the kneading part 10. The material is fed into the barrel 12 through the material inlet 16 by rotationally driving the screw 19 by the drive motor 20. The material should desirably be fed continuously quantitatively into the barrel 12 in order to achieve stable kneading of the material.

The material fed into the barrel 12 is kneaded by the two screw shafts 11 that are rotationally driven in the same rotational direction at the same speed in a state in which they are mutually synchronized by the kneading drive motor 15 and the gearbox 14. Specifically, the material is fed and placed in a space surrounded by the screw channel portion formed on the outer periphery of each of the screw shafts 11 and the inner peripheral surface of the barrel 12. The material placed as described above is moved so as to turn round the mutually engaged outer peripheries of the screw shafts 11, i.e., around a sectionally generally bottle-gourd-shaped circumferential orbit by the rotational driving of the screw shaft 11, while the material is plasticized and kneaded by receiving the effects of compression and shearing in the process of the movement. Moreover, during the operation as described above, the material is heated by the electric heater 27 to assist the promotion of the plasticization and to improve the kneadability.

In the processes of kneading and plasticization of the material as described above, removal of air bubbles and volatile components mixed in the material, i.e., a deaerating process, is performed. The deaerating process is executed by performing vacuuming by the vacuum pump 22 through the vent portion 21 provided at the barrel 12. In particular, by using the mutually engaged two screw shafts as in the kneading part 10 of the present first embodiment, the kneadability of the plasticized material can be improved, and it becomes possible to further improve the deaerability by increasing the efficiency of removing the air bubbles and volatile components existing in the material through the kneading process as described above.

Moreover, the plasticizing, kneading and deaerating processes of the material are carried out in the process of turning round the screw shafts 11, and the material in the plasticized state or the kneaded state is sent to the forward side of the screw shafts 11, i.e., to the downward side in FIG. 3, and the material is fed from the kneaded material feed throat 26 to the injecting part through the filter 23 and the breaker plate 24. Moreover, the material feed from the kneading part 10 as described above is performed so as to be fed continuously quantitatively. By performing the continuous quantitative feed as described above, it becomes possible to maintain uniform processing conditions to be effected on the material that passes through the inside of the barrel 12. It is noted that the internal pressure of the barrel 12 is suppressed from becoming higher than a setting pressure by detecting and monitoring a pressure in the vicinity of the outlet port of the barrel 12 by the pressure sensor 25.

On the other hand, in the injecting part 30 in the state as shown in FIG. 3, the screw shaft 31 is put in a state in which it is located on the forward side (leftward side in the figure), i.e., in an advance position P1 by the injection drive unit 33. It is noted that the material loading space S1 does not exist on the forward side of the injection screw shaft 31 in the state in which the shaft is located in the advance position P1 as described above. In the state as described above, the material in the kneaded state in the kneading part 10 is fed into the material retention space S2. On the screw shaft 31, the retention screw channel portion 37 is formed so as to be able to secure a capacity larger than that of the weighing screw channel portion 36. Therefore, in the material retention space S2, the pressure becomes lower than in the communicating peripheral space, and a so-called starvation state to the material feed is to be formed. Therefore, in the material retention space S2, even if the kneaded material is fed continuously quantitatively by the kneading part 10, it becomes possible to sufficiently retain the fed material. In this case, the "starvation state" means a state in which the retention screw channel portion 37 is not completely filled with the material and a space that is not filled with the material is existing in the internal space of its partial screw channel, i.e., a state in which the material retention space S2 is not completely filled with the material. In the state as described above, the pressure in the material retention space S2 can be maintained lower than in the adjacent space, and it becomes possible to smoothly receive the fed material and to securely retain the material. Moreover, methods for securing the material retention space S2 as described above include, for example, deepening the channel depth of the retention screw channel portion 37 with respect to the weighing screw channel portion 36, increasing the screw lead angle, changing the number of screw threads and so on, and these methods can be determined according to the melt viscosity or the like of the material to be handled.

Figure 4:
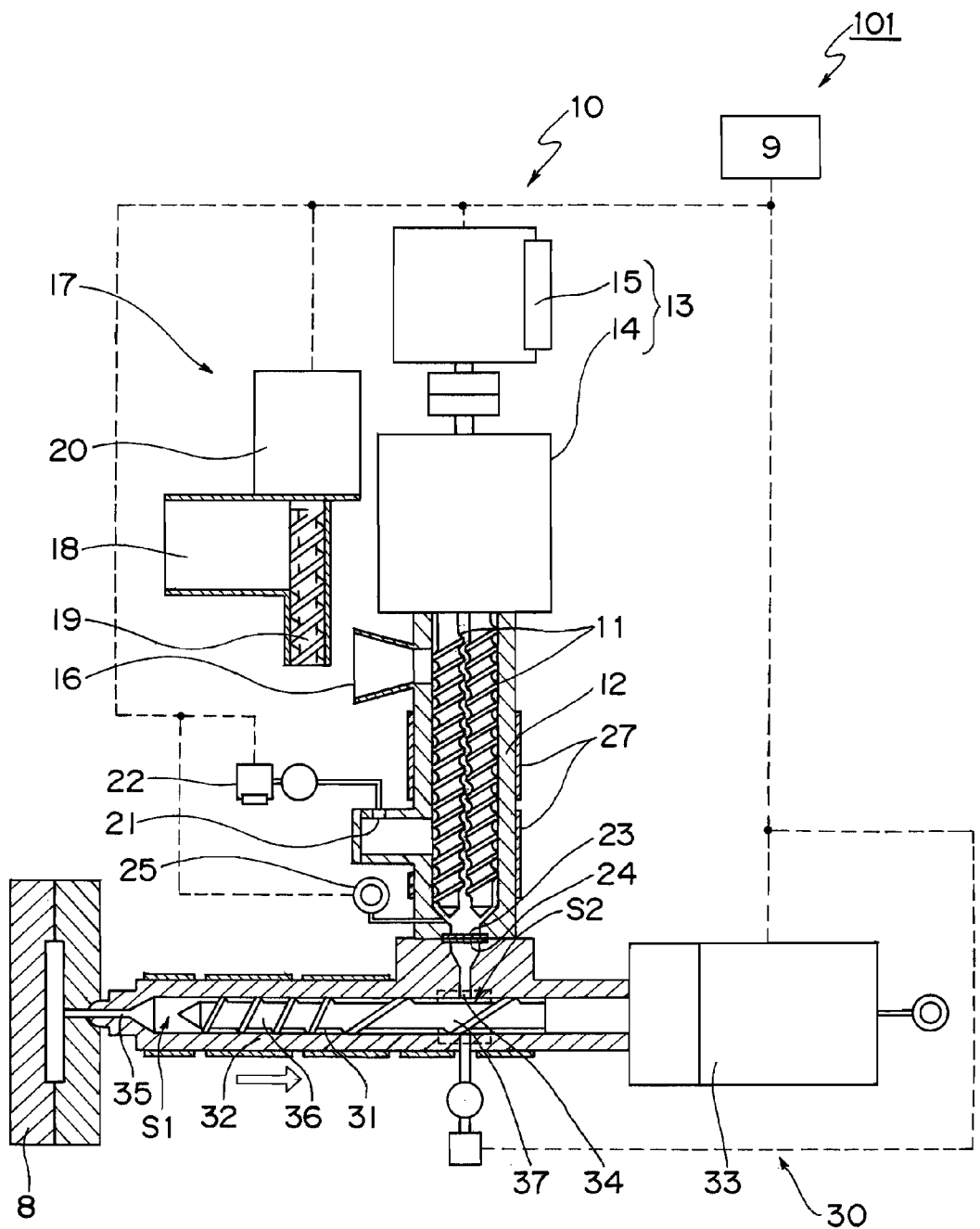
FIG. 4 is a schematic explanatory view following FIG. 3, showing a state in which the injection screw shaft is retreatively moved while being rotationally moved, and weighing and loading of a material are performed.
Figure 7:
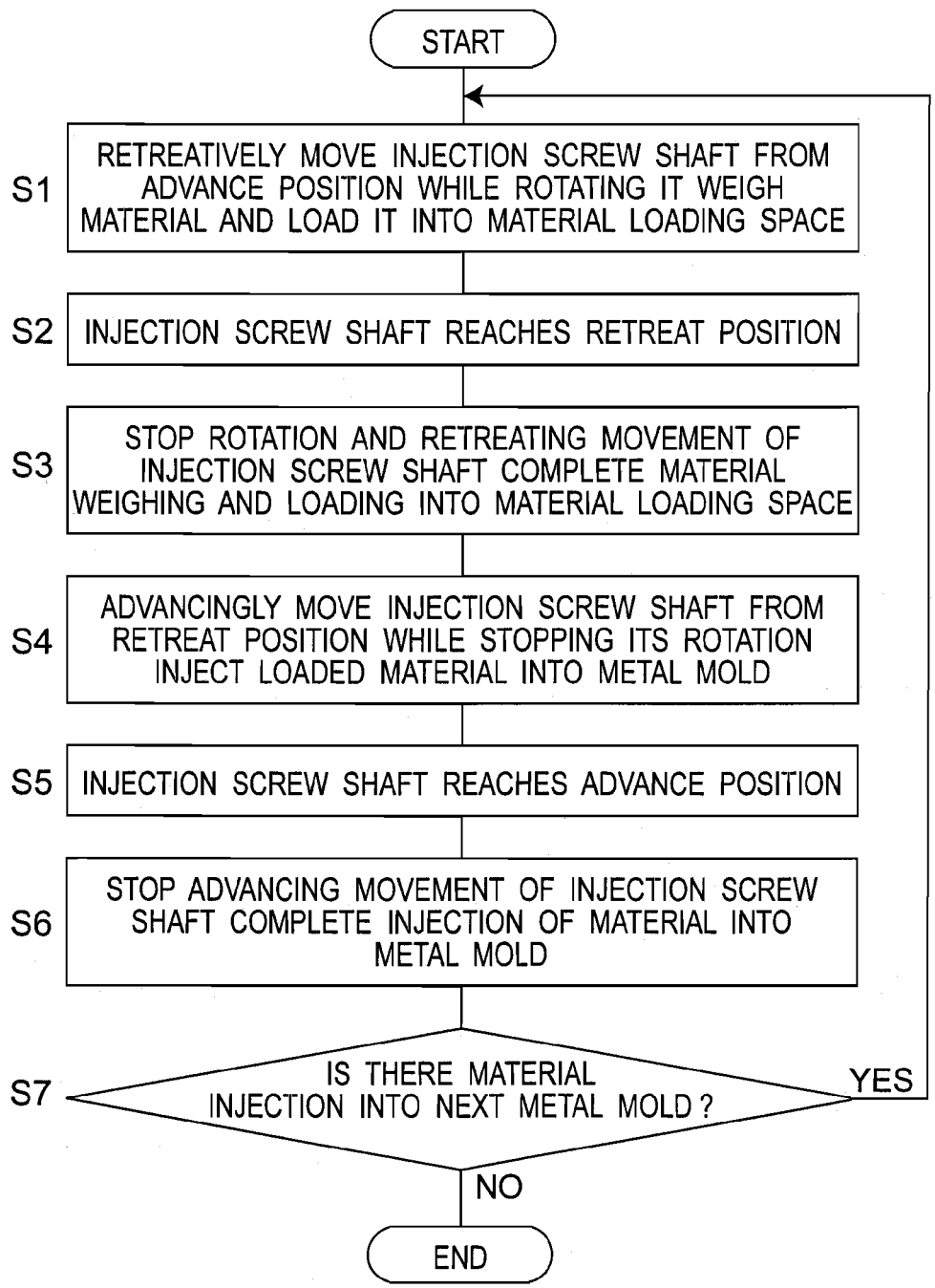
FIG. 7 is a flow chart showing the operational processes of the injecting part in the apparatus integrated with the kneading part and the injecting part of the first embodiment.

While performing the continuous quantitative feed of the material in the kneaded state as described above, a retreating movement of the rotating screw shaft 31 is started in the injecting part 30 as shown in FIG. 4 (step S1 in the flow chart of FIG. 7). In particular, as shown in FIG. 3, the screw shaft 31 located in the advance position P1 is driven to retreatively slide while being rotationally driven by the injection drive unit 33. As a result, a space is formed in front of the screw shaft 31 as shown in FIG. 4. Moreover, by rotationally driving the screw shaft 31 during the retreating movement, the material (material in the plasticized state) fed and retained in the material retention space S2 is moved to the forward side from the retention screw channel portion 37 to the weighing screw channel portion 36 with the rotational driving, and the material weighed by the prescribed amount in the weighing screw channel portion (i.e., weighed by the capacity of the channel portion and the amount of rotational driving) is sent and loaded into the material loading space S1 that is the space formed on the forward side.

The kneading part 10 is continuously driven even when the material weighing and loading processes are performed during the retreating movement of the screw shaft as described above, and the continuous quantitative material feed into the material retention space S2 where the starvation state is maintained is continued. Moreover, by rotation of the screw shaft 31, the material feed into the material retention space S2 is performed so that the material fed from the communication port 34 turns round the lower side of the screw shaft 31 as shown in FIG. 2, so that the material feed is smoothly performed.

Figure 5:
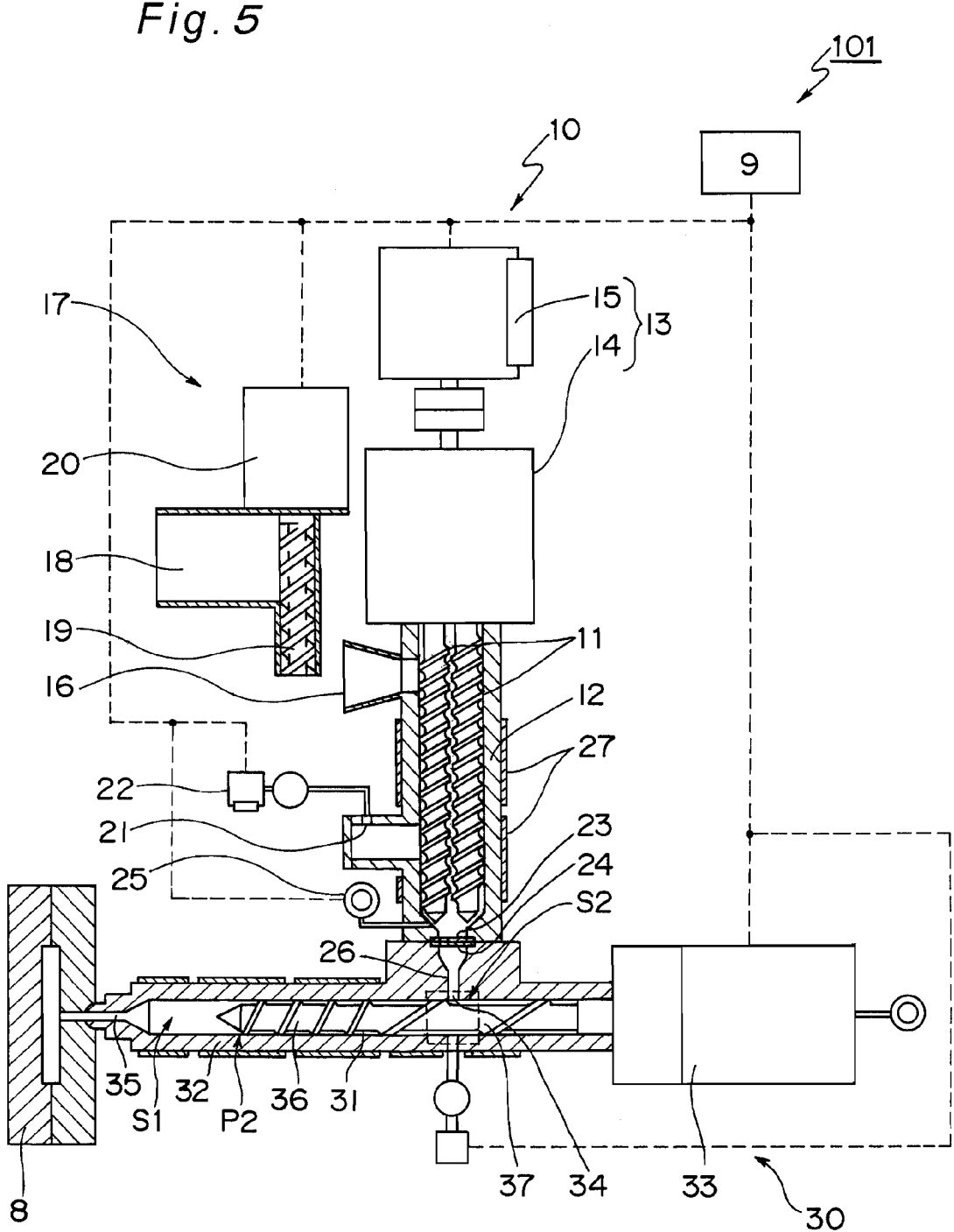
FIG. 5 is a schematic explanatory view following FIG. 4, showing a state in which the injection screw shaft is located in a retreat position, and loading of the material is completed.

When the retreating movement and the rotational movement of the screw shaft 31 are performed at the prescribed speed, and the screw shaft 31 reaches its retreat position P2 as shown in FIG. 5 (step S2), the slide movement and the rotational movement of the screw shaft 31 by the injection drive unit 33 are stopped. In the state in which the screw shaft 31 is located in its retreat position P2 as described above, the material loading space S1 of a prescribed size is formed on the forward side of the screw shaft 31, and a state in which the plasticized material is densely loaded in the material loading space S1, i.e., a state in which the loading is completed is established (step S3). The material feed from the kneading part 10 is continued continuously and quantitatively even in the state in which the rotational movement and the slide movement of the screw shaft 31 are stopped as described above. However, since the starvation state is consistently maintained in the material retention space S2, the material feed and the retention of the fed material are not obstructed. Moreover, the formation range along the axial direction of the retention screw channel portion 37 on the screw shaft 31 is determined so that the starvation state as described above can be maintained whether the screw shaft 31 is located in the retreat position P2 or the advance position P1.

Figure 6:
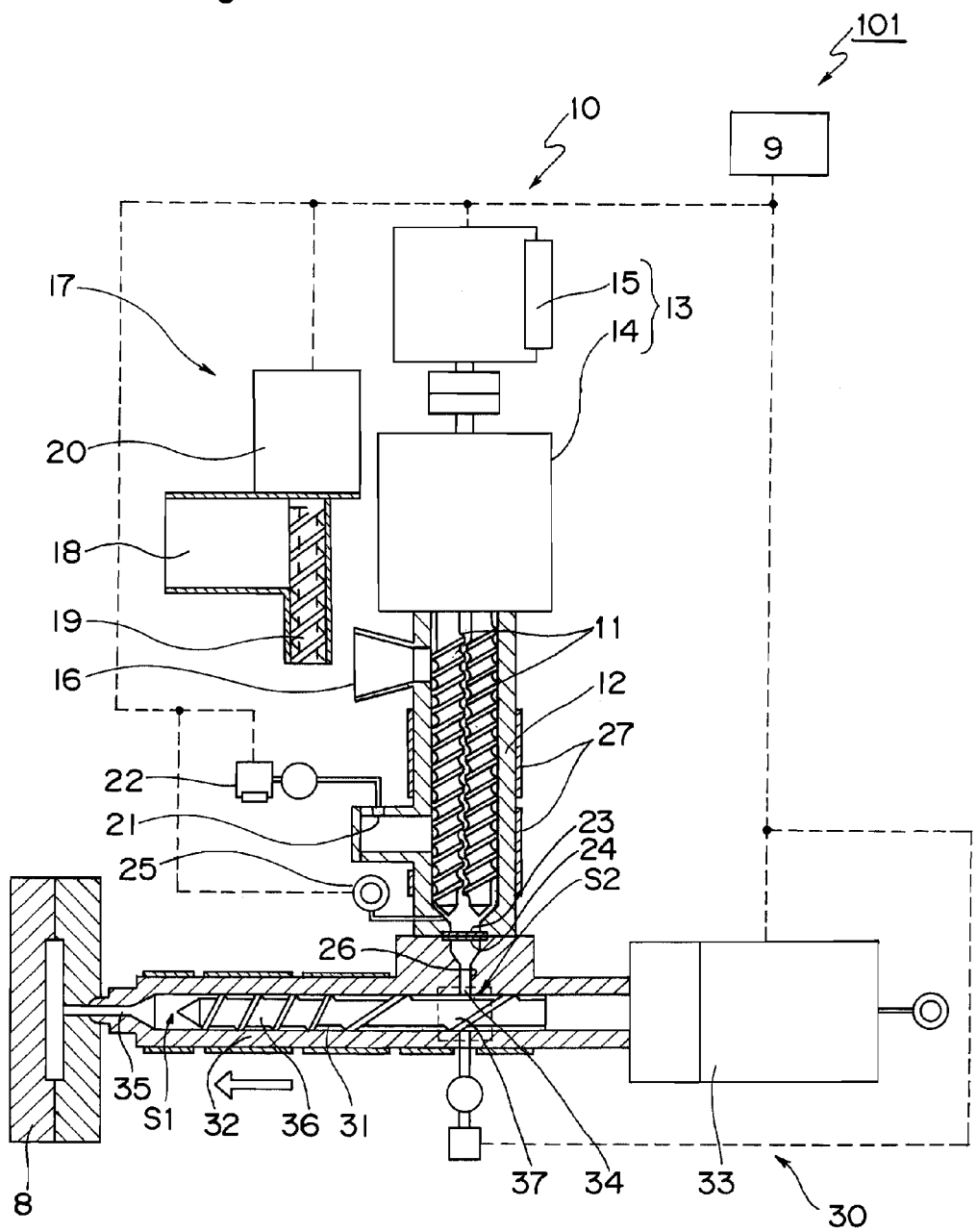
FIG. 6 is a schematic explanatory view following FIG. 5, showing a state in which the injection screw shaft is advancingly moved, and injection of the loaded material is performed.

Subsequently, as shown in FIG. 6, the advancing movement of the screw shaft 31 located in the retreat position P2 toward the forward side is started in the injecting part 30 by the injection drive unit 33. During the advancing movement, the rotational movement of the screw shaft 31 is kept in the stopped state. By the advancing movement of the injection screw shaft 31 as described above, the material densely loaded in the material loading space S1 is injected from the injection port 35, and the loading of the material (injection molding material) into the injection molding mold 8 is started (step S4).

In due course of time, a state in which the whole material loaded in the material loading space. S1 is injected into the mold 8 is established when the screw shaft 31 reaches its advance position P1 as shown in FIG. 3 (step S5), and the advancing movement of the screw shaft 31 by the injection drive unit 33 is stopped (step S6). It is noted that the continuous quantitative material feed from the kneading part 10 is continuously performed also during the advancing movement and the stop of the screw shaft 31 as described above.

When the loading of the material into the injection molding mold 8 is completed as described above, it is confirmed in step S7 whether or not a metal mold to be next subjected to the loading of the material exists. When it is confirmed that the next metal mold exists, the metal mold is connected to the injecting part 30, and the operation in step S1 is repeated. As shown in FIG. 3 and FIG. 4, the retreating movement of the screw shaft 31 from the advance position P1 toward the retreat position P2 while rotating is started, and the weighing of the material and the loading of the material into the material loading space S1 are restarted as described above. Subsequently, the weighing, loading and injection of the material are sequentially performed according to the procedures as described above to repetitively perform the loading of the material into the metal mold 8 (steps S2 through S6). When it is determined in step S7 that no metal mold is present, the operation of the apparatus 101 is stopped, and the kneading and injection molding operations are completed.

In the sequence of the processing processes in the injecting part 30 as described above, vacuuming for sufficient deaeration from the vent space S3 provided adjacently above the material retention space S2 through the vent portion 38 is performed by the vacuum pump 39. Moreover, the sight glass 40 is provided above the material retention space S2 and the vent space S3 so that the feed state of the material into the injecting part 30 can be easily observed.

Moreover, also in a state in which the injection screw shaft 31 subsequently reaches its retreat position P2 (step S2) and the rotation is stopped (step S3), in order to securely achieve the continuous quantitative material feed from the kneading part 10 into the material retention space S2, the shape of the communication port 34 is also allowed to have an elliptic shape that extends in the axial direction of the injection screw shaft 31 as shown in, for example, the schematic explanatory view of FIG. 9.

Figure 9:
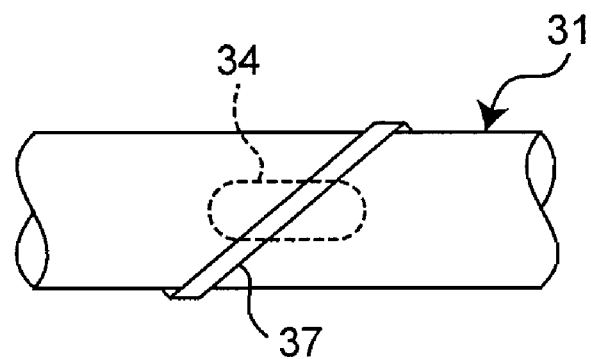
FIG. 9 is a schematic explanatory view showing a positional relation between the injection screw shaft and a communication port in the apparatus integrated with the kneading part and the injecting part of the first embodiment.

FIG. 9 is a schematic explanatory view showing the positional relation between the injection screw shaft 31 and the communication port 34. By making the communication port 34 have an elliptic shape, a portion of the communication port 34 interrupted by the screw flight can be reduced in the state in which the rotation of the injection screw shaft 31 is stopped, and the stability of the material feed can be further improved. In order to improve the stability of the continuous quantitative material feed, the duration in which the communication port 34 is partially interrupted by the screw flight can also be shortened by rotating the injection screw shaft 31 at very low speed without completely stopping the rotation in step S3.

According to the first embodiment, the following various effects can be obtained.

It is important for such an apparatus that performs the injection molding to preparatorily sufficiently deaerate volatile components and air bubbles from the material to be plasticized and kneaded also for the improvement of the quality of the product. On the other hand, in the apparatus construction in which the kneading part and the injecting part are connected together, it is sometimes the case where the deaerating function cannot sufficiently be achieved by only the screw shaft provided in the injecting part. That is, since the general conventional injecting apparatus needs the slide movement of the screw shaft, assuming that the injection molding apparatus has a twin-axis screw configuration, then an adverse effect is produced due to the engagement of the screws during the slide movements of the screw shafts. It is naturally preferable to provide a single-axis screw configuration in consideration of preventing such an adverse effect beforehand. As a result, the conventional apparatus that performs injection molding has a problem that sufficient kneading of the material cannot be performed and it is difficult to perform sufficient deaeration.

In contrast to this, the apparatus 101 of the first embodiment, by virtue of the construction in which the kneading part 10 is provided with the multi-axis configuration, i.e., the two screw shafts 11 provided mutually engaged, the input material can effectively undergo pressurization and shearing, and the plasticization and kneading can be sufficiently performed. As a result, it becomes possible to sufficiently perform the deaerating process of the material in the kneading part 10. Furthermore, by performing vacuuming through the vent portion 21 by the vacuum pump 22 in the kneading part 10, it becomes possible to improve the deaerability of the material. Therefore, the material, which has been sufficiently deaerated in the kneading part 10, can be fed to the injecting part 30, and this obviates the need for performing the deaerating process in the injecting part 30.

Moreover, the apparatus 101 integrated with the kneading part and the injecting part of the first embodiment adopts a construction such that the plasticization, kneading and deaerating processes of the material are performed in the kneading part 10, and the material in the sufficiently kneaded state is fed directly to the injecting part 30. This therefore obviates the need for performing the plasticization, kneading and so on of the material in the injecting part 30 and allows the construction of the injecting part 30 to be simplified, allows the injection screw shaft 31 to be rotated at higher speeds than in the conventional case because the plasticization is unnecessary and allows the loading of the material into the material loading space S1 to be performed in a comparatively short time. By eliminating the necessity of the plasticizing function of the injecting part 30, the screw lead angle can be increased, and it becomes possible to achieve high-speed loading of the material even if the rotational speed of the shaft itself is comparatively low. By making it possible to achieve such high-speed loading, the material dwell time in the injecting part 30 can be shortened, and the deterioration of the physical properties and so on of the material can be suppressed. Furthermore, in the injection screw shaft 31, the screw portion for plasticization, which has conventionally been necessary, can be made unnecessary or shortened, and an injection stroke (i.e., slide movement distance of the screw shaft 31) can be elongated even with same cylinder length. As a result, the injection capacity can be increased while employing a screw shaft of a comparatively small diameter, and this can contribute to the downsizing of the apparatus construction. Moreover, assuming that the injection pressure is the same, the resisting pressure of the apparatus depends on the diameter of the screw shaft 31 of the injecting part 30, and therefore, the resisting pressure of the apparatus can be reduced by downsizing the diameter of the screw shaft 31. As described above, by downsizing the apparatus construction and allowing the resisting pressure of the apparatus to be suppressed to a low level, energy conservation of the apparatus can be achieved.

Moreover, according to the first embodiment, in the injecting part 30, the operation of the screw shaft 31 becomes intermissive operation, i.e., intermittent operation of the retreating movement while rotating (weighing and loading processes), stop and advancing while stopping the rotation (injection of the material to be loaded) and stop and the retreating movement while rotating again. In the apparatus construction in which the kneading part 10 where the continuous quantitative material feed is performed is connected to the injecting part 30 where the intermittent operation is performed as described above, a balance between the continuous material feed rate and the intermittent injection rate is important.

In the conventional apparatus construction as disclosed in JP H07-106586, only the construction in which the kneading part and the injecting part are simply connected together is disclosed, and no description is provided for such a balance between the feed rate and the injection rate. Furthermore, the disclosed apparatus construction adopts an apparatus construction such that the kneading part is connected to a portion corresponding to the so-called weighing portion in the injecting part and the material feed is performed. In such a conventional apparatus, it becomes difficult to sufficiently retain the continuously fed material in the injecting part, and pressure fluctuations are consequently large, causing a concern about influences on quality.

In contrast to this, in the injecting part 30 of the first embodiment, the injection screw shaft 31 is constructed so that the retention screw channel portion 37 whose channel capacity is increased in comparison with the weighing screw channel portion 36 is consistently located in the formation position of the communication port 34 to which the kneading part 10 is connected, by which the material fed from the kneading part 10 can be retained in the material retention space S2 formed by the retention screw channel portion 37. In particular, by virtue of the provision of the material retention space S2 that is the comparatively large space as described above, a pressure in the material retention space S2 can be maintained low to the peripheral space, and the space S2 can be consistently in the starvation state. Therefore, it becomes possible to stably retain the material fed continuously quantitatively from the kneading part 10 regardless of the intermittent operation of the injection screw shaft 31. Furthermore, the injecting part 30 communicates with the kneading part via the material retention space S2 kept in the starvation state, by which the influence of the injection pressures generated in the material loading space S1, the weighing screw channel portion 36 and so on of the injecting part 30 exerted on the kneading part 10 can be remarkably reduced. Therefore, the screw back pressure in the injecting part 30 can be prevented from being applied to the kneading part 10 even if no changeover valve is provided at the connection portion of the kneading part 10 and the injecting part 30. In order to consistently maintain the starvation state in the material retention space S2 as described above, it is proper to calculate the rate per unit time of the material continuously fed from the kneading part 10 on the basis of the duration in which the injection screw shaft 31 is stationary, advancing and maintaining the pressure, i.e., the duration in which its rotation is stopped and to set the capacity of the material retention space S2 at least not smaller than the rate.

The Second Embodiment

The present invention is not limited to the above embodiment but allowed to be implemented in other various modes. For example, a schematic structural view of an apparatus 201 integrated with a kneading part and an injecting part, which is one example of the integrated apparatus that has the kneading part and the injecting part according to the second embodiment of the present invention is shown in FIG. 8.

Although the apparatus 201 differs from the apparatus construction of the first embodiment in that a metering gear pump 7, which is one example of the metering device for highly accurately maintaining the quantitativeness of the material feed is provided at a connection portion of a kneading part 210 and an injecting part 230, the other apparatus constructions are similar. In the following description, only the point of difference is described. It is noted that the same components as those of the apparatus 101 of the first embodiment are denoted by the same reference numerals in FIG. 8 and no description is provided therefor.

Figure 8:
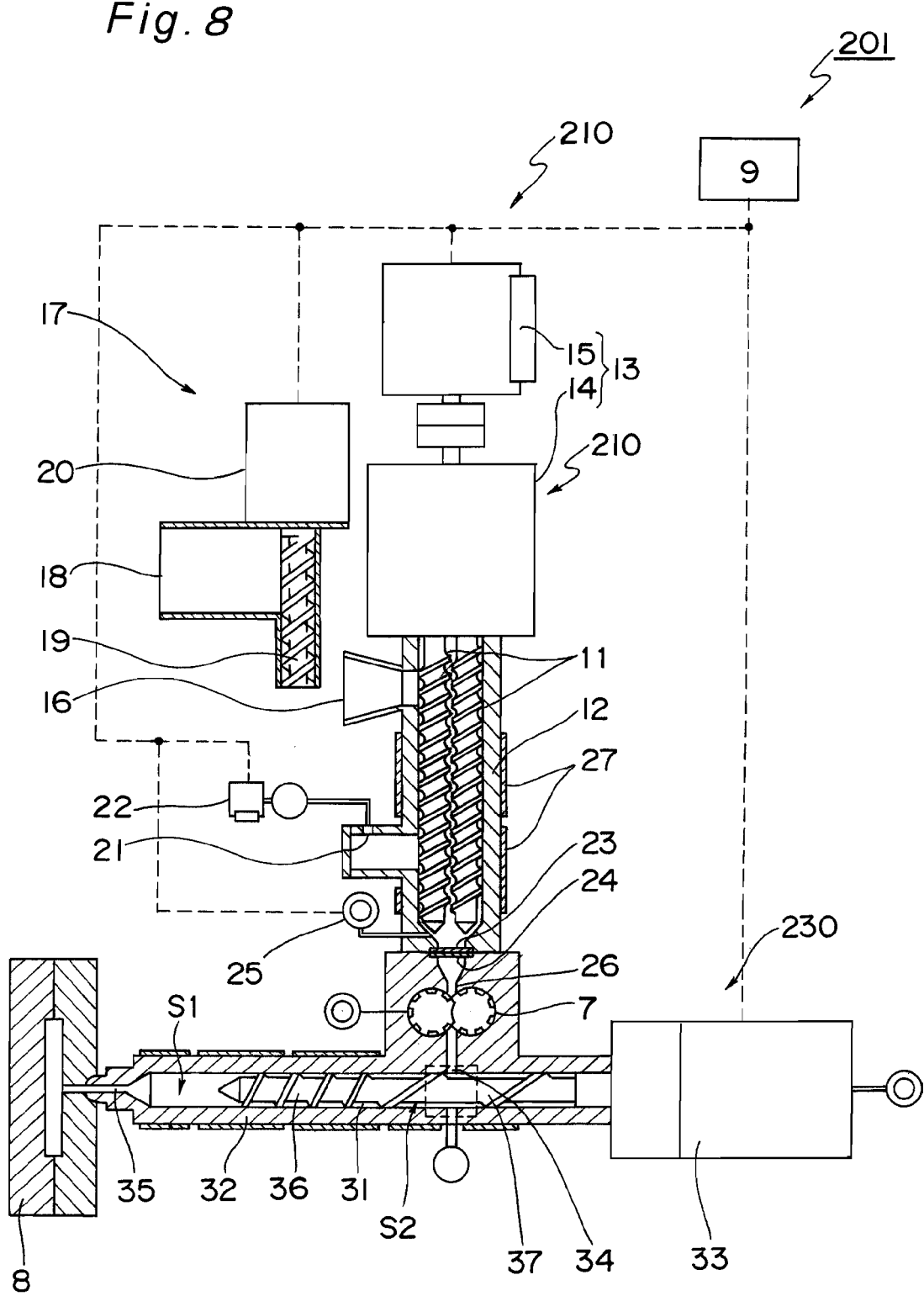
FIG. 8 is a schematic structural view of an apparatus integrated with a kneading part and an injecting part according to a second embodiment of the present invention.

As shown in FIG. 8, in the apparatus 201, the metering gear pump 7 that continuously quantitatively feeds a material to the injecting part 230 is provided at a kneaded material feed throat 26 in the kneading part 210. The metering gear pump 7 is driven interlockedly with a kneading drive motor 15 of the kneading part 210, and the material in the kneaded state in the kneading part 210 can be quantitatively fed with a high degree of accuracy.

As described above, by virtue of the metering gear pump 7 provided at the connection portion of the kneading part 210 and the injecting part 230 in the apparatus 201 integrated with the kneading part and the injecting part, it becomes possible to feed the kneaded material to the injecting part 230 in a state in which its quantitativeness is further improved. Moreover, the metering gear pump 7 plays the role of a sort of brake for the material feed at the outlet of the kneading part 210, by which the internal pressure of the kneading part 210 can be increased, and the deaerability of the material can be further improved.

Although the case where the kneading part and the injecting part are connected together mutually perpendicularly in the respective axial directions has been described in connection with each of the embodiments, the present invention is not limited to the above case, and other various constructions can be adopted. For example, it may be a case where the kneading part is connected to the injecting part in an inclined state. Particularly, in a construction such that both of them are connected together in a state in which the tip end side of the kneading part is inclined toward the tip end side of the injecting part, the material feed from the kneading part to the injecting part can be made smoother.

Moreover, although the case where the multi-axis or, for example, twin-axis screw shafts are provided in the kneading part has been described in each of the embodiments, it may be a case where a single-axis screw configuration is employed in the kneading part in place of the above case. In such a single-axis screw configuration, the kneading and deaerating effects are reduced in comparison with the multi-axis screw configuration. However, in a case where a material such that the volatile components are little and the kneadability is required not so much, the apparatus construction can be further simplified by adopting the single-axis configuration.

Moreover, although the case where the vent portion is provided in the injecting part has been described, it may be a case where the vent portion in the injecting part is unnecessary. In each of the above embodiments, vacuuming (vacuum venting) by the vacuum pump is performed by utilizing the vent portion in the kneading part, and the material in a sufficiently deaerated state is fed to the injecting part, therefore obviating the need to provide a vent portion at the injecting part. However, by providing a vent portion in the position of the injecting part to which the material is fed from the kneading part, i.e., in the material retention space as in each of the embodiments, it becomes possible to further improve the deaerating effect of the material. Moreover, by performing injection of an inert gas or the like into the space by utilizing the vent portion in the material retention space, antioxidation (inert gas seal) for the material can also be achieved.

Moreover, although the case where the weighing screw channel portion 36 and the retention screw channel portion 37, which are the two kinds of the screw channel portions, are formed mutually adjacently on the injection screw shaft 31 has been described in the embodiments, the arrangement of the screw channel portions is not limited to the above case. It is also possible to form, for example, an adjusting portion (returning portion or an adjusting screw channel portion) that has a screw lead and a channel depth for making a smoother material flow between the weighing screw channel portion 36 and the retention screw channel portion 37 instead of the above case. Such an adjusting portion can be formed as, for example, a screw channel portion of a shape intermediate between the weighing screw channel portion 36 and the retention screw channel portion 37.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2006-211188 filed on Aug. 2, 2006, including specification, drawings and claims are incorporated herein by reference in its entirety.

The invention claimed is:

1. An integrated apparatus having a kneading part and an injecting part,
the kneading part comprising:
a kneading screw shaft;
a kneading shaft drive unit for driving rotation of the kneading screw shaft; and
a kneading barrel, in which the kneading screw shaft is rotatably inserted and placed, and kneading of a material is performed by rotating the kneading screw shaft, and which continuously quantitatively feeds the kneaded material from a kneaded material feed throat at a tip end thereof,
the injecting part comprising:
an injection screw shaft;
an injection shaft drive unit for rotatably driving the injection screw shaft and driving advancing and retreating movements along an axial direction of the injection screw shaft; and
an injection cylinder, in which the injection screw shaft is inserted and placed rotatably with a capability of advancing and retreating along an axial direction thereof, and a communication port and an injection port are formed, the communication port being formed so as to communicate with the kneaded material feed throat of the kneading barrel and receive the fed material in a kneaded state, and the injection port being formed so as to permit injection of the material weighed by the screw shaft therefrom, wherein
the injection screw shaft located in the injecting part, comprises:
a weighing screw channel portion for weighing the material by rotational driving amount of the injection screw shaft and loading the material into a material loading space formed on a forward side by retreating movement of the injection screw shaft; and
a retention screw channel portion which is formed adjacently to the weighing screw channel portion so that a channel shape thereof is different and forms a material retention space for retaining the material fed continuously quantitatively from the kneading part.

2. The integrated apparatus having the kneading part and the injecting part, as defined in claim 1, wherein:
the injection screw shaft is operable to move in an advancing direction and a retreating direction between a retreat position where the material loading space is formed and an advance position where the injection of the material from an injection port, the material being weighed and loaded in the material loading space, is completed by the injection shaft drive unit in the injecting part; and
the retention screw channel portion is formed on the injection screw shaft so that the material retention space is located at the communication port regardless of the advancing and retreating movements of the injection screw shaft between the advance position and the retreat position.

3. The integrated apparatus having the kneading part and the injecting part, as defined in claim 2, wherein
the retention screw channel portion is formed on the injection screw shaft so that the material fed continuously quantitatively from the kneading part through the communication port is retained in the material retention space during the advancing movement from the retreat position toward the advance position in a state in which the rotation is stopped.

4. The integrated apparatus having the kneading part and the injecting part, as defined in claim 1, wherein:
the kneading screw shaft comprises two screw shafts which are formed in a wave-like shape having an identical diameter and an identical root diameter and are mutually engaged and arranged in parallel;
the kneading shaft drive unit rotates the two screw shafts at an identical speed in an identical direction; and
the screw shafts are rotatably inserted in the kneading barrel, a kneading process for the material is performed by rotational driving of the two screw shafts, and a deaerating process for the material is performed.

5. The integrated apparatus as defined in claim 1, wherein the kneaded material feed throat is positioned so that kneaded material is fed directly from the kneading barrel to the communication port of the injection cylinder.

* * * * *